Figure 1:
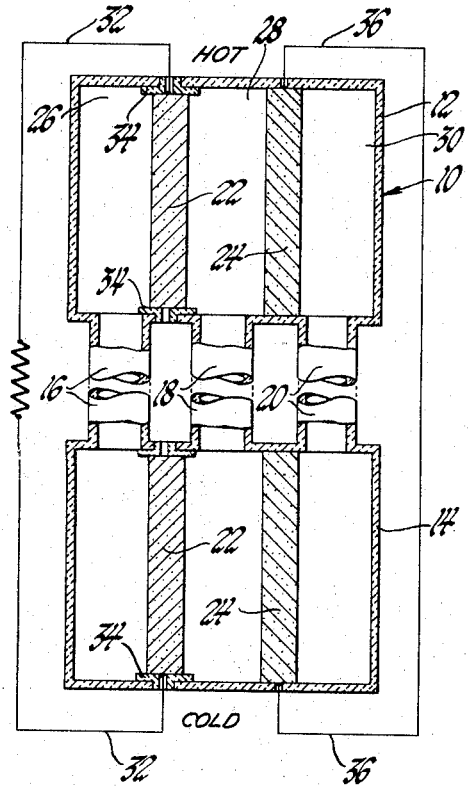

Feb. 27, 1968  J. J. LANDER ET AL  3,370,983

ELECTROTHERMAL TRANSDUCER AND METHOD OF OPERATING SAME

Filed Dec. 18, 1961

INVENTORS
John J. Lander
Stanley W. Smith &
BY Robert D. Weaver

L. J. Wallace
ATTORNEY

United States Patent Office 3,370,983
Patented Feb. 27, 1968

3,370,983
ELECTROTHERMAL TRANSDUCER AND
METHOD OF OPERATING SAME
John J. Lander, Anderson, Stanley W. Smith, Chesterfield, and Robert D. Weaver, Anderson, Ind., assignors to General Motors Corporation, Detroit, Mich., a corporation of Delaware
Filed Dec. 18, 1961, Ser. No. 159,919
8 Claims. (Cl. 136—86)

This invention relates to electrothermal transducers and more particularly to an electrochemical power source, such as can be used to convert heat into electrical power, such as in an earth satellite power supply system.

It is an object of this invention to provide an earth satellite electrical power supply system. It is a further object of the invention to provide an electrothermal transducer. Still a further object of the invention is to provide an electrochemical power source. Other objects of the invention are to provide a method of converting heat into electrical power and to provide a method of producing alkali metals and halogens.

Figure 3:
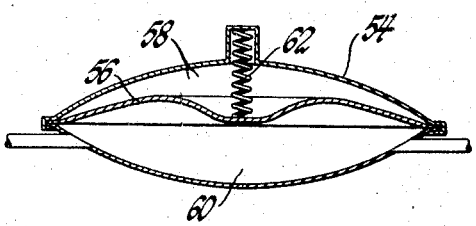
Figure 2:
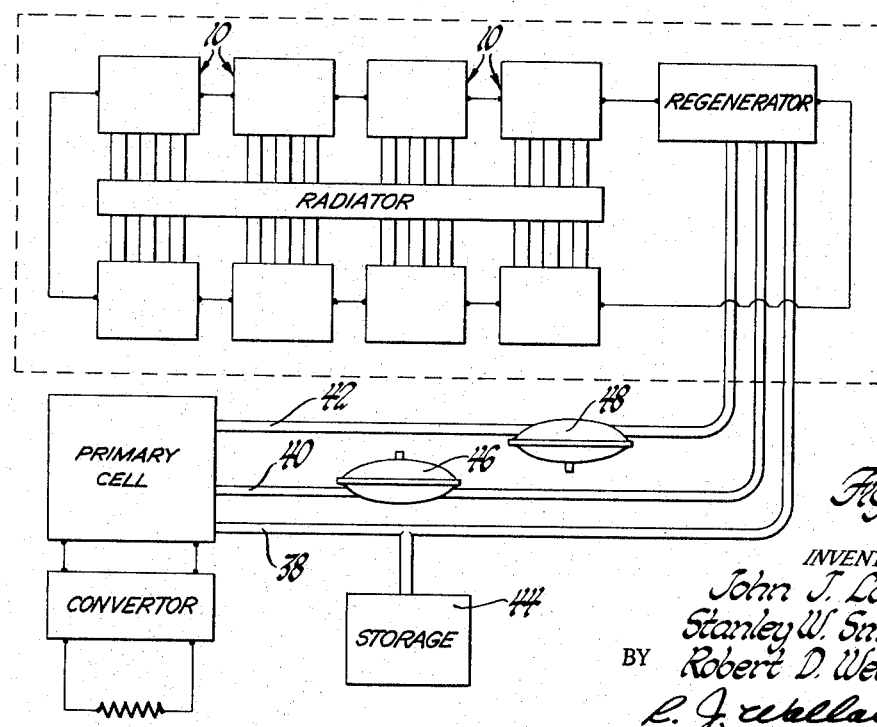

These and other objects, features and advantages of the invention will become more apparent from the following description of preferred embodiments thereof and from the drawing, in which:

FIGURE 1 contains a schematic view of a transducer made in accordance with the invention;

FIGURE 2 shows a diagrammatic view of a heat regenerative earth satellite power supply system; and FIGURE 3 shows a cross-sectional view through a liquid storage tank which can be used in the invention.

The invention comprehends a transducer formed of a cold voltaic cell which electrolyzes a hot electrolytic cell to regenerate the voltaic cell reactants. In the voltaic cell a halogen and an alkali metal are electrochemically combined to form a salt. In the electrolytic cell the salt is electrolyzed so as to decompose it and form free alkali metal and free halogen. When the electrolytic cell is at a temperature higher than the voltaic cell, only some of the electrical power produced by the voltaic cell need be used to completely regenerate the free alkali metal and free halogen used to produce that power. Hence, there is a net electrical power available to do useful work.

A more complete description of the invention is more readily accomplished in connection with the drawing. In FIGURE 1 there is shown a container 10 having a hot portion 12 and a cold portion 14 which are joined by the conduits 16, 18 and 20.

Partitions 22 and 24 divide the container 10 into three separate chambers 26, 28 and 30. The partitions 22 form divider walls for chambers 26 and 28. The partitions 24 form divider walls for chambers 28 and 30. The porous partitions 22 and 24 not only serve as chamber forming means but also function as electrodes and current collectors. Lead 32 interconnects partitions 22. In the event container 10 is made of a metal, the partitions, or electrodes, 22 are insulated from the container 10 by means of insulators 34. Partitions 24 are interconnected by means of lead 36. Chlorine gas (not shown) is used in chamber 26 and molten sodium chloride (not shown) is used in chamber 28. Sodium (not shown) is used in chamber 30.

The container may be formed of a plurality of materials, such as nickel, stainless steel, tantalum, molybdenum, alumina, silicon carbide, etc. Any material that is thermally stable at the operating temperatures of the transducer and resistant to chemical attack by the reactants and products of the transducer system can be used. Hence, the materials selected for the container can vary depending upon the nature of the materials being reacted in the transducer system. As previously indicated, if metal is used as a container material, the porous partitions 22 should be insulated from the container 10 to avoid short circuiting the system. In some circumstances it may be desired to form a composite container in which parts are of different materials. For example, the sodium side might be iron and the chlorine side might be titanium or the like.

As previously indicated, the porous partitions 22 between the chlorine gas and the sodium chloride in both the hot part 12 and the cold part 14 of the ransducer also function as gas electrodes. While many conductive porous materials will function as a gas electrode, it may be preferred in some instances to provide a catalytic surface on the electrode to allow higher current densities to be obtained. Porous graphite having a pore size of 0.0013 inch-0.0055 inch and a porosity of about 48% can be used as the chlorine electrode; hence, as the porous partition 22. In any event, best results are obtained with an electrode in which the pore size on the electrolyte side of the electrode is much smaller than the pore size of the electrode on the gas side.

As sodium metal, itself, functions as an electrode, the porous partition 24 is only needed to prevent intermixing of the sodium chloride and the sodium. Consequently, the porous partition can be of any material that effectively prevents intermixing but allows ion communication. Obviously, all the partitions must be relatively chemically inert to the electrolyte and the reactants. However, it is preferred for best cell efficiency that the porous partitions 24 also function as current collectors. Porous iron having a 10–50 micron pore size and a 50% porosity will serve this purpose. A further consideration is that the electrode inhibit migration of molten sodium into the sodium chloride electrolyte where it is soluble. This can be inhibited by using an electrode of extremely smaller pore size on the sodium side than on the electrolyte side.

The dual pore size electrode is referred to in "High Drain Hydrogen Diffusion Electrode Operating at Ambient Temperature and Pressure," by Edward Justi et al., Akademie der Wissenschaften und der Literatur, Abhandlungen der Mathematisch-Naturwissenschaftlichen Klasse, 1959, No. 8. This electrode can be formed in a plurality of ways, one of which is to employ a composite, or laminate, electrode formed of two sheets having different pore sizes.

There is a tendency for the heat of the hot portion 12 to be transferred to the cold portion 14 of the transducer and, thus, reduce its efficiency. This transfer can be minimized by using a heat exchanger (not shown) between the two portions so that heat is removed from incoming cold cell reactants in conduits 16 and 20 and transferred to cold cell outgoing products in conduit 18. In the alternative the cold cell could be refrigerated, but in most instances this would be both inefficient and impractical.

The system is operative so long as the electrolyte remains molten. Sodium chloride is molten within the range of approximately 800° C. to 1400° C. Consequently, for a sodium chloride transducer the cold cell must be at least above a temperature of approximately 800° C. so that the sodium chloride will be molten in the cold cell. On the other hand, the hot cell should not be above a temperature of 1400° C., which is below the boiling point of sodium chloride. A theoretical maximum efficiency within these temperature ranges is approximately 39.4%.

With the described arrangement, there is a net energy obtained which is the difference between the electrical energy generated by the cold cell as it is discharged and that absorbed by the hot cell during electrolysis. The heat necessary to maintain the higher temperature portion at that higher temperature may be supplied from any convenient source of heat, such as nuclear, chemical or solar heat. The unit shown in FIGURE 1 is a true transducer in that no energy is stored in the unit. As the temperature of the hot portion of the transducer is reduced (or that of the cold portion raised) there is a corresponding decrease in net energy available. When the two portions of the transducer are at the same temperature, the energy required to regenerate the reactants is the same energy obtained when combining them. Hence, there is no extra energy available.

As previously indicated, the transducer system inherently involves the use of a cold voltaic cell to electrolyze a hot electrolytic cell and produce a net power output. Obviously, the terms hot and cold are relative and only serve to indicate that there is a temperature difference between the electrolytic cell and the voltaic cell. Even a very small difference in temperature between the electrolytic cell and the voltaic cell will yield a net power output.

For maximum yield of power per unit weight and volume of a given substance it is desired that the temperature differential between the electrolytic cell and the voltaic cell be quite large. In the present instance a satisfactory arrangement can be obtained with the cold cell being operated at a temperature of approximately 810° C. and the hot cell being operated at a temperature of approximately 1400° C. As sodium is a vapor above a temperature of approximately 900° C. the sodium is regenerated as a gas and is condensed before use in the cold cell. As this regeneration and condensation occur within the same chamber, no significant problem is involved. Moreover, if desired, sodium can be used purely in the gaseous state. Sodium vapor generated at about 1400° C. can be cooled to a lesser temperature and used as sodium vapor at that lesser temperature.

A unique feature of our invention is that the transducer is self-operative and needs no moving parts to accomplish either the regeneration of cell reactants or the inherent transfer of the materials in the regeneration process. As sodium chloride is being formed in the cold cell, it increases the volume of the electrolyte in the cold cell forcing it up conduit 18 into the hot cell where it is electrolyzed to form chlorine and sodium. The chlorine and sodium thus formed have an inherent tendency to migrate to the cold cell. Hence, no external pumping action is necessary as it is inherent in the transducer, itself.

The manner in which our invention is used in forming a satellite power supply system is schematically shown in FIGURE 2. In FIGURE 2 there is shown a primary cell which is interconnected by means of conduits 38, 40 and 42 to a regenerator. In principle, the primary cell and the regenerator are analogous to the cold portion and hot portion, respectively, of the transducer shown in FIGURE 1. However, in addition, the interconnecting conduits 38, 40 and 42 between the primary cell and the regenerator also have reservoirs 44, 46 and 48 for storage of materials passing therethrough. In addition, the primary cell is not electrically connected to the regenerator but to a D.C. to D.C. converter which is, in turn, connected to an external load which uses the power generated by the primary cell. The D.C. to D.C. converter, of course, is merely used to increase the voltage obtained from the primary cell and can be omitted or varied, as desired.

The regenerator is electrically connected to four transducers of the type shown in FIGURE 1 by means of electrical leads. However, these transducers are connected in series to the regenerator so that, as heat is applied to the transducers, regeneration of sodium chloride produced during discharge of the primary cell is regenerated into sodium and chlorine. While it is not necessary that the regenerator be at a higher temperature than the primary cell in the system shown in FIGURE 2, if it is at a higher temperature there is a reduction in the power needed to regenerate; hence a lesser number of transducers required to furnish the power which, in turn, means a lesser weight and volume for the power supply system.

While storage of the chlorine gas can be in any convenient closed chamber, means must be provided in the sodium storage chamber 48 and sodium chloride storage chamber 46 to induce movement of the materials stored in the chambers under a no-gravity environment. Such movement can be readily attained by means of a reservoir 54 shown in connection with FIGURE 3. The reservoir is dome-like in outer configuration and has a central diaphragm 56 which partitions the reservoir into two separate chambers 58 and 60. The diaphragm is not only inherently biased (as shown) but is also biased by a spring 62. As fluid enters the lower chamber 60 it exerts a pressure against the diaphragm, compressing the spring 62, to effect enlargement of the lower chamber 60. As the pressure of the fluid is decreased, spring pressure exerted against the diaphragm reduces the volume of the lower chamber 60, causing the fluid to flow out of the reservoir 54. While this is only one construction of the reservoir, it is to be understood that any suitable means of storing a fluid can be employed.

While the invention has been described principally as a transducer for a power supply system, it is to be recognized that the voltaic cell portion, the cold portion of the transducer, is a fuel cell which can be used as a source of power with or without regeneration of the reactants. Moreover, it is to be recognized that the electrolytic cell, the hot portion of the transducer, can be used as a means for producing free sodium and free chlorine. Hence, our invention not only includes the combined use of the voltaic cell and the electrolytic cell as a transducer and as a part of a power supply system but also as independent entities.

It is to be understood that while this invention has been described in connection with certain specific examples thereof, no limitation is intended thereby except as defined in the appended claims.

We claim:

1. An electrothermal transducer comprising at least two interconnected molten salt electrochemical cells, each of said cells having a negative electrode chamber with an inert porous negative electrode, a positive electrode chamber with an inert porous positive electrode, and an electrolyte chamber for a molten salt therebetween, an alkali metal halide salt in said electrolyte chamber for providing ion communication between said negative and positive electrodes, one of said cells adapted for operation at a higher temperature than the other, said other cell adapted for operation at a lower temperature than said one cell, means for drawing electrical power from the lower temperature cell, means for applying part of the electrical power generated by the lower temperature cell to the higher temperature cell so as to electrolyze the alkali metal halide salt in the latter to produce free alkali metal at its negative electrode and free halogen at its positive electrode, means for conveying the free halogen from the positive electrode of the higher temperature cell to the positive electrode of the lower temperature cell for reaction thereat, means for conveying the free alkali metal from the negative electrode of the higher temperature cell to the negative electrode of the lower temperature cell for reaction thereat, and means for conveying said alkali metal halide salt from the electrolyte chamber of the lower temperature cell to the electrolyte chamber of the higher temperature cell for electrolysis.

2. The electrothermal transducer defined in claim 1 wherein the alkali metal is sodium, the halogen is chlorine, and the alkali metal halide salt is sodium chloride.

3. The electrothermal transducer defined in claim 1 wherein the transducer is further characterized by having dual porosity electrodes.

4. In an electrical power supply system, an electrothermal transducer comprising at least two interconnected molten salt electrochemical cells, each of said cells having a negative electrode chamber with an inert porous negative electrode, a positive electrode chamber with an inert porous positive electrode, and an electrolyte chamber for a molten salt therebetween, an alkali metal halide salt in said electrolyte chamber for providing ion communication between said negative and positive electrodes, one of said cells adapted for operation at a higher temperature than the other, said other cell adapted for operation at a lower temperature than said one cell, means for maintaining said one cell at a higher temperature than said other cell, means for drawing electrical power from the lower temperature cell, means for applying electrical power to the higher temperature cell so as to electrolyze the alkali metal halide salt in the latter to produce free alkali metal at its negative electrode and free halogen at its positive electrode, means for conveying the free halogen from the positive electrode of the higher temperature cell to the positive electrode of the lower temperature cell for reaction thereat, means for conveying the free alkali metal from the negative electrode of the higher temperature cell to the negative electrode of the lower temperature cell for reaction thereat, and means for conveying said alkali metal halide salt from the electrolyte chamber of the lower temperature cell to the electrolyte chamber of the higher temperature cell for electrolysis.

5. The electrical power supply system as defined in claim 4 wherein a reservoir is included as a part of each conveying means.

6. An electrothermal transducing method which comprises the steps of heating two interconnected molten salt electrochemical cells to a temperature above the liquidus temperature of cell reactants and products, each of said cells having a negative electrode chamber with an inert porous negative electrode, a positive electrode chamber with an inert porous positive electrode, and an electrolyte chamber for a molten salt therebetween, an alkali metal halide salt in said electrolyte chamber for providing ion communication between said negative and positive electrodes, continuing to apply heat to one of said cells to maintain it at a higher temperature than the other of said cells, maintaining said other cell at a lower temperature than said one cell but drawing electrical power from the lower temperature cell, applying part of the electrical power generated by the lower temperature cell to the higher temperature cell to electrolyze the alkali metal halide salt in the latter to produce free alkali metal at its negative electrode and free halogen at its positive electrode, conveying the free halogen from the positive electrode of the higher temperature cell to the positive electrode of the lower temperature cell for reaction thereat, conveying the free alkali metal from the negative electrode of the higher temperature cell to the negative electrode of the lower temperature cell for reaction thereat, and conveying said alkali metal halide salt from the electrolyte chamber of the lower temperature cell to the electrolye chamber of the higher temperature cell for electrolysis.

7. The electrothermal transducing method defined in claim 6 wherein the alkali metal is sodium, the halogen is chlorine, the salt is sodium chloride, the higher temperature cell is maintained above about 900° C., and the lower temperature cell is maintained at a temperature of about 810–900° C.

8. The electrothermal transducing method as defined in claim 6 wherein the alkali metal is a vapor in the higher temperature cell and a liquid in the lower temperature cell.

References Cited

UNITED STATES PATENTS

| | | | |
|---|---|---|---|
| 2,610,985 | 9/1952 | Schumacher | 136—86 |
| 2,635,431 | 4/1953 | Bichowsky | 136—86 |
| 2,921,110 | 1/1960 | Crowley et al. | 136—86 |
| 3,000,801 | 9/1961 | Davies et al. | 204—60 |
| 3,022,233 | 2/1962 | Olstowski | 204—60 |
| 3,031,518 | 4/1962 | Werner et al. | 136—86 |

FOREIGN PATENTS

| | | |
|---|---|---|
| 6,417 | 5/1888 | Great Britain. |
| 1,266,037 | 5/1961 | France. |

ALLEN B. CURTIS, *Primary Examiner.*

JOHN R. SPECK, WINSTON A. DOUGLAS,

*Examiners.*

H. FEELEY, *Assistant Examiner.*